United States Patent

Moraru et al.

[11] 4,094,691

[45] June 13, 1978

[54] MORTAR FOR ANTICONDENSATE, ANTIMOISTURE, HEAT-INSULATING, AND BIOCIDAL PLASTER

[75] Inventors: Dinu Stefan Moraru; Ion Pitis, both of Bucharest; Constantin Bogos, Iasi, all of Romania

[73] Assignee: Institutul de Cercetari in Constructii si Economia Constructiilor, Bucharest, Romania

[21] Appl. No.: 776,268

[22] Filed: Mar. 10, 1977

[51] Int. Cl.² ............................................. C04B 7/355
[52] U.S. Cl. ....................................... 106/95; 106/97; 106/119; 106/DIG. 1

[58] Field of Search ............. 106/95, 119, 97, DIG. 1

[56] References Cited

U.S. PATENT DOCUMENTS

| | | | |
|---|---|---|---|
| 1,749,923 | 3/1930 | Reardon | 106/95 |
| 1,957,415 | 5/1934 | Wechter | 106/95 |
| 2,611,713 | 9/1952 | Glick | 106/95 |

*Primary Examiner*—J. Poer
*Attorney, Agent, or Firm*—Karl F. Ross

[57] ABSTRACT

A mortar for interior and exterior plastering having anticondensate, antimoisture diffusive, heat insulating and biocidal properties is disclosed.

4 Claims, No Drawings

MORTAR FOR ANTICONDENSATE, ANTIMOISTURE, HEAT-INSULATING, AND BIOCIDAL PLASTER

FIELD OF THE INVENTION

This invention relates to mortars with anticondensate, antimoisture diffusive, heat-insulating, and biocidal qualities to be used for interior or exterior plastering, or both, with a view to eliminating moisture caused mostly by condensation, capillary infusion (dampness of walls), and the fungi promoted thereby.

BACKGROUND OF THE INVENTION

Technical literature has disclosed mortars for either interior or exterior plaster possessed of either anticondensate or animoisture diffusive, heat-insulating, or biocidal properties.

The main disadvantages of these mortars is that they do not concentrate all the above-mentioned properties in one single product, that they consist of expensive materials (silicones, palmitates, etc.), and that they necessitate laborious preparation and application techniques in use.

SUMMARY OF THE INVENTION

This invention eliminates these disadvantages. It uses a porpous powdery material, such as an pearlite, as aggregate which is mixed with a complex solution of water-repellant agents such as calcium stearate, copper naphthenate, and tributyl stannic oxide (the second having antivegetational properties and the third biostatic ones) in white spirits; this mixture is then mixed with the binding agent of the mortar consisting of lime paste, cement and water in such proportions as are given in the practical examples below. The end result is a mortar having concomitantly all the above-mentioned properties: anticondensate, antiffusive of humidity, heat-insulating, and biocidal.

Thus the invention comprises:

Mortars for interior plastering having concomitantly anticondensate, antimoisture diffusive, heat-insulating, and biocide properties, and consisting of a mixture (in volume parts) of:

| | |
|---|---|
| pearlite grains (~1 mm) | about 20 parts |
| copper naphthenate solution in white spirit in proportions by volume 1:1 | an effective amount up to 0.1 parts; |
| calcium stearate powder | 0.1 to 0.2 parts; |
| white spirit | an effective amount up to 1 part; |
| lime paste | about 5 parts; |
| Portland cement | 2 to 2.5 parts; and |
| water | about 5 parts. |

Mortars for exterior plastering having concomitantly anticondensate, antimoisture, heat-insulating, and biocide properties, and consisting of a mixture (in volume parts) of:

| | |
|---|---|
| pearlite grains (~1 mm) | about 17 parts; |
| calcium stearate | 0.3 to 0.4 parts; |
| copper naphthenate | an effective amount up to 0.8 parts; |
| white spirit | an effective amount up to 1 part; |
| lime paste | about 5 parts; |
| cement | about 3 parts; and |
| water | about 5 parts. |

The preparation technology of the mortars described above and characterized by first mixing the pearlite grains with the water-repellant solutions and the biocide agents, then separately the binding agents with water, and finally applying the two mixtures together, the resulting mixture being applied to the walls as any standard plaster.

Three examples of practical application are given in the summarizing table below. The quantities for each formula are for 1 sq.m. of plastering.

| Type of mortar | Ingredients | Quantity (in liters) | Obs. |
|---|---|---|---|
| I. Mortar for interior plastering (recommended for bathrooms and kitchens) | Pearlite | 26.7 | |
| | Copper naphthenate | 0.134 | |
| | Calcium stearate | 0.134 | Thickness 2 cm |
| | White spirit | 1.34 | |
| | Lime paste | 6.7 | |
| | P.400 cement | 3.34 | |
| | Water | 6.7 | |
| II. Mortar for interior plastering | Pearlite | 20 | |
| | Copper naphthenate | 0.05 | |
| | Calcium stearate | 0.15 | |
| | White spirit | 1 | Thickness 1.5 cm. |
| | Lime paste | 5 | |
| | P.400 cement | 2.3 | |
| | Water | 5 | |
| III. Mortar for exterior plastering | Pearlite | 17 | |
| | Copper naphthenate | 0.05 | |
| | Calcium stearate | 0.35 | |
| | White spirit | 0.9 | Thickness 1.5 cm. |
| | Lime paste | 5 | |
| | P.400 cement | 3 | |
| | Water | 5 | |

According to this invention, the advantages of the anticondensate, antimoisture diffusive, heat-insulating, and biocidal plaster are as follows:

It presents a new concept as regards the composition of a water-repellent plaster: with pearlite as one of the ingredients, a material made of porous particles, the particles are covered by just enough water-repellent and biocide solution to lend them a hydrofuge quality without, while so doing, plugging their pores; thus, through mixing with hydrolysate binding agents (cement and lime), acicular crystals of hydrolisates and hydroaluminates, carbonates included, form separators which thrust themselves into the pores of the water-repellent pearlite, bestowing on the plastering, by means of a three-dimensional structure, water-repellent, antimoisture diffusive, and biocidal properties, operating simultaneously.

The plaster allows the temperature of the treated surfaces to rise by about 6° C, being thus a good heat insulator with a heat-transfer coefficient, $\lambda$, in the range of 0.01 - 0.02 kcal/cm/degree.

It consists of easily obtainable and inexpensive materials.

It does not require an application technique different from that used in the case of standard plastering.

We claim:

1. A mortar for interior plastering having anticondensate, antimoisture diffusive, heat insulating and biocidal properties, consisting essentially of a mixture in volume parts of:
    about 20 parts of 1 mm pearlite grains;
    an effective amount up to 0.1 parts of a copper naphthenate solution in white spirit in proportions by volume of 1:1;
    0.1 to –0.2 parts of calcium stearate powder;
    an effective amount up to 1 part of white spirit;
    about 5 parts of lime paste;
    2 to 2.5 parts of Portland cement; and
    about 5 parts of water.

2. A mortar for exterior plastering having anticondensate, antimoisture diffusive, heat insulating and biocidal properties, consisting essentially of a mixture in volume parts of:
    about 17 parts of 1 mm pearlite grains;
    0.3 to 0.4 parts of calcium stearate;
    an effective amount up to 0.8 parts of copper naphthenate;
    an effective amount up to 1 part of white spirit;
    about 5 parts of lime paste;
    about 3 parts of cement; and
    about 5 parts of water.

3. A method of preparing a mortar for interior plastering having anticondensate, antimoisture diffusive, heat insulating and biocidal properties, comprising the steps of:
    forming a first mixture of about 20 parts of 1 mm pearlite grains, an effective amount up to 0.1 parts of a copper naphthenate solution in white spirit in proportion by volume of 1:1, 0.1 to 0.2 parts of calcium stearate powder and an effective amount up to 1 part of white spirit;
    forming a second mixture of about 5 parts of lime paste, 2 to 2.5 parts of Portland cement and about 5 parts of water; and
    combining said first mixture and said second mixture to form said mortar.

4. A method of preparing a mortar for exterior plastering having anticondensate, antimoisture diffusive, heat insulating and biodical properties, comprising the steps of:
    forming a first mixture of about 17 parts of 1 mm pearlite grains, 0.3 to 0.4 parts of calcium stearate, an effective amount up to 0.8 parts of copper naphthenate and an effective amount up to 1 part of white spirit;
    forming a second mixture of about 5 parts of lime paste, about 3 parts of cement and about 5 parts of water; and
    combining said first mixture and said second mixture to form said mortar.

* * * * *